Figure 3:
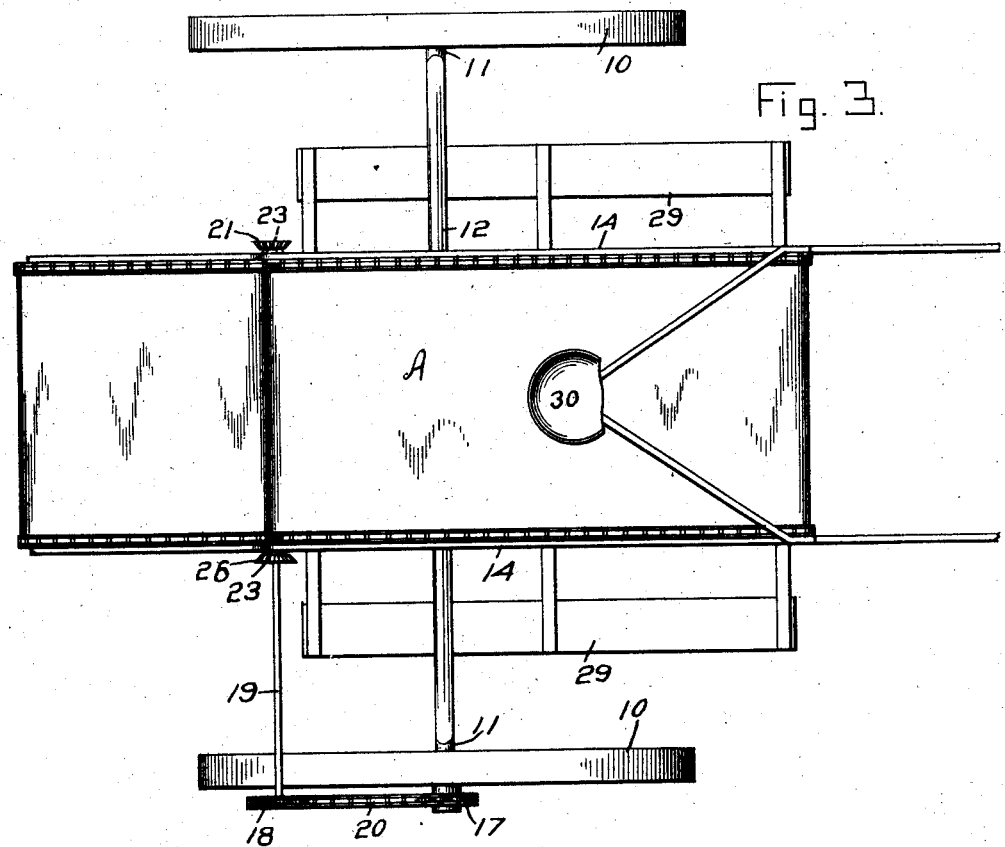

No. 883,618. PATENTED MAR. 31, 1908.
A. J. BUHLER.
MEANS FOR GATHERING AND DESTROYING POTATO BUGS.
APPLICATION FILED JAN. 29, 1907.
3 SHEETS—SHEET 1.
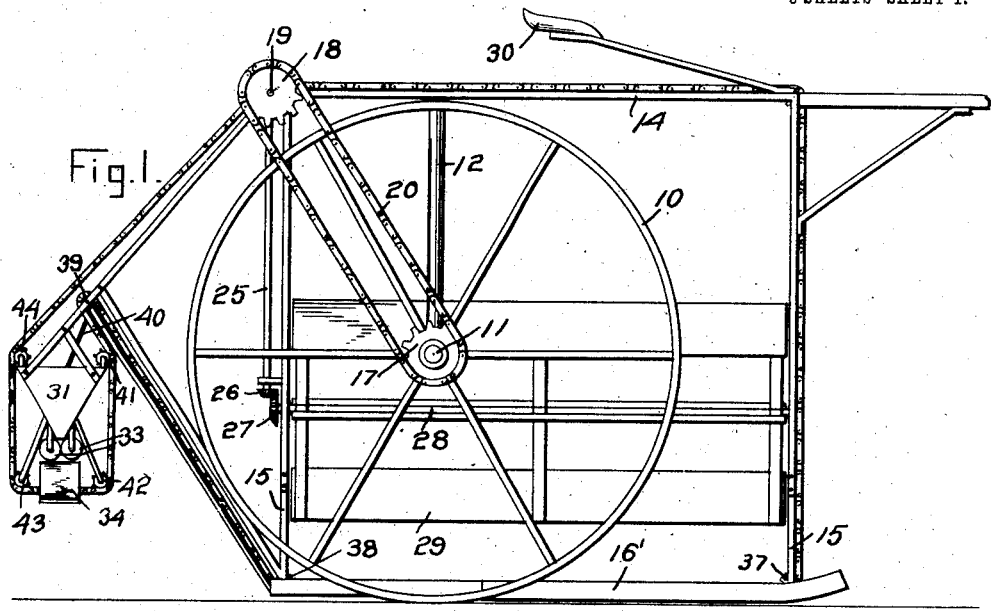
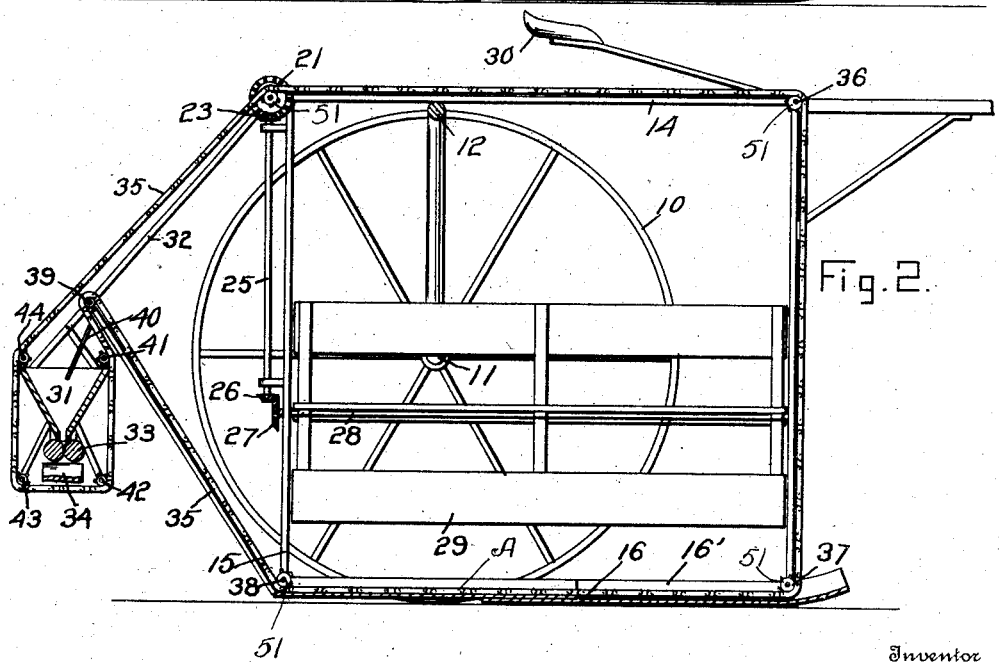
Witnesses
C. K. Reichenbach.
F. B. MacNab.
Inventor
A. J. Buhler.
By Chandler & Chandler
Attorneys.

No. 883,618. PATENTED MAR. 31, 1908.
A. J. BUHLER.
MEANS FOR GATHERING AND DESTROYING POTATO BUGS.
APPLICATION FILED JAN. 29, 1907.

3 SHEETS—SHEET 2.

No. 883,618. PATENTED MAR. 31, 1908.
A. J. BUHLER.
MEANS FOR GATHERING AND DESTROYING POTATO BUGS.
APPLICATION FILED JAN. 29, 1907.
3 SHEETS—SHEET 3.
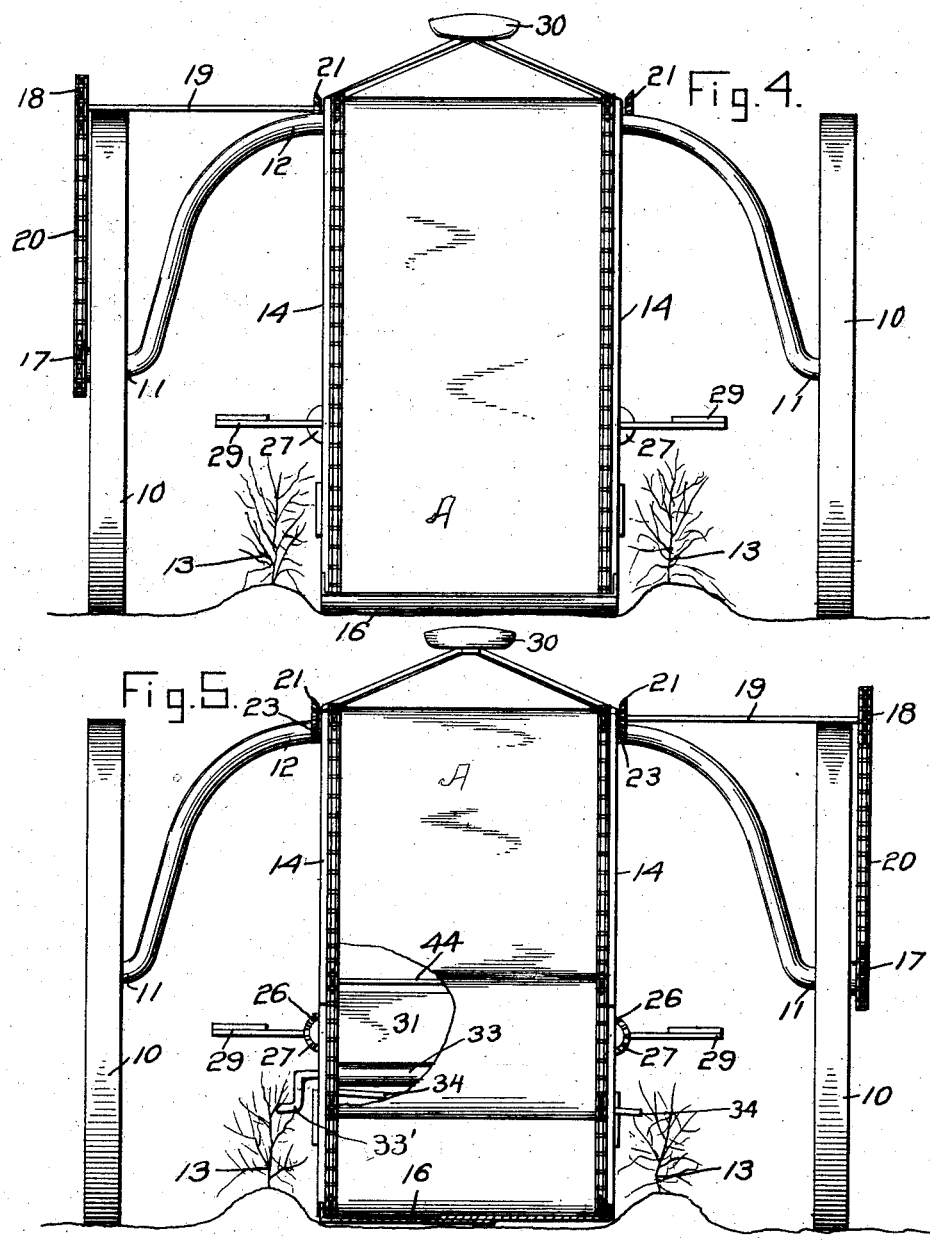
Witnesses
C. H. Reichenbach.
F. B. MacNab.
Inventor
A. J. Buhler.
By Chandler & Chandler
Attorneys
THE NORRIS PETERS CO., WASHINGTON, D. C.

UNITED STATES PATENT OFFICE.

ABRAHAM J. BUHLER, OF HARRIS, MINNESOTA.

MEANS FOR GATHERING AND DESTROYING POTATO-BUGS.

No. 883,618.　　　　Specification of Letters Patent.　　Patented March 31, 1908.

Application filed January 29, 1907. Serial No. 354,668.

*To all whom it may concern:*

Be it known that I, ABRAHAM J. BUHLER, a citizen of United States, residing at Harris, in the county of Chisago, State of Minnesota, have invented certain new and useful Improvements in Means for Gathering and Destroying Potato-Bugs; and I do hereby declare the following to be a full, clear, and exact description of the invention, such as will enable others skilled in the art to which it appertains to make and use the same.

This invention has relation to means for gathering and destroying potato-bugs; the object of the invention being to provide a light, strong and efficient implement that may be drawn by a horse between the rows of growing vines, and strike or brush the bugs therefrom into a pan arranged between the wheels from which they may be taken and killed in any desirable way.

The nature of the invention is to be ascertained from the implement illustrated in the annexed drawings, forming a part of this specification, in view of which it will first be described with respect to its construction and mode of operation and then be pointed out in the subjoined claims.

Of the said drawings—Figure 1 is a side elevation of the implement embodying the invention. Fig. 2 is a central longitudinal section. Fig. 3 is a plan. Fig. 4 is a front view. Fig. 5 is a rear view.

Similar numerals of reference designate similar parts or features, as the case may be, wherever they occur.

In the drawings 10 designates the ground wheels of the implement which are constructed and arranged to turn on the spindles 11 of an upwardly bowed axle 12. The wheels 10 are disposed preferably at a distance far enough apart to have two rows of vines 13 pass between them, and the axle extends high enough between the wheels to not only pass over the vines, but to have the means for gathering the bugs pass beneath the same.

A rectangular frame 14, is supported on the axle and extends forwardly and rearwardly of the same, and is provided at its sides with steel straps 15 which extend down to and support the pan 16, which may be arranged on a plane near the ground. The pan has raised sides 16' and is divided centrally and longitudinally with overlapping edges, so that the sides may be brought closer together or spaced wider apart to suit the width of the rows of vines.

17 designates a sprocket wheel secured on the hub of one of the wheels 10 over which and over a sprocket wheel, 18, on a shaft 19 supported in bearings on the back of the frame there passes a sprocket-chain, 20, so that the said shaft 19 may be operated from the wheels 10.

21 designates miter gears on the shafts 19, which gears mesh with like miter gears 23 having openings through their centers on square vertical shafts 25 supported in bearings in the sides of the frame.

The vertical shafts 25 have miter gears 26 on their lower ends which mesh with and drive similar miter gears 27 secured on horizontally arranged shafts 28 which are provided with radially arranged beaters or brushes 29 suitable for striking the vines on the sides opposite to the pan 16 and knocking, as it were, the bugs on the vines into the pan supported, as explained, between the rows of vines.

A seat 30 is suitably supported on the frame on which the driver of the implement may sit.

Shafts (not shown) may be connected with the forward end of the machine to which a horse may be hitched so that he may walk between the rows of vines operated upon by the beaters 29, and draw the apparatus over the ground.

The bugs swept off the vines by the beaters into the pan will be gathered or taken off from time to time and killed in any suitable manner.

The pan 16 is extended from a line a little forward of the axle 12 to the rear of the frame, and the beaters or brushes for striking the bugs from the vines are made substantially of the same length as the pan, so that the vines, by a frequent beating of the same, may have the bugs quite thoroughly cleared therefrom.

Potato-beetles or bugs when disturbed on the vines fold their legs and wings and assume an entirely quiescent condition for a considerable time and remain as though dead, so that it is easy to deal with them when they are brushed off the vines into the pan.

Thus far I have described the invention with respect to gathering the bugs from the vines on the pan 16, and taking them from the latter and destroying them, and under this mode of employment the machine is complete. However, in some instances, I propose to carry the invention farther, and by slight additions to the particular means described and shown, gather the bugs from the pan and collect them in a hopper, provided with means for killing them and afterward discharging them upon the ground in the field.

To the ends aforesaid, I have provided a hopper 31 that is supported on the rear of the machine by a frame-work of rods 32 connected with the frame 14 in any suitable way, the said hopper being in width coextensive with the width of the pan. At the bottom of the hopper there are two rollers 33 adapted to be rotated as, for instance by a crank 33' on the end of one of the said rollers so as to carry anything falling down between them from the hopper through to a receiving board 34, inclined laterally so that anything falling on the said board 34 may be carried off to one side of the machine.

35 designates an endless belt of a width coextensive with the distance between the sides 16 of the pan, which belt 35 is carried over the rod or roller upon the shaft 19 forward over a roller 36 supported in the upper part of the frame, then down about the rollers 37 and 38 near the base of the pan where the edges of the belt are carried along by a sprocket-chain 50 engaging the sprocket-wheels 51 on the ends of the several belt-carrying shafts, above the pan 16, beneath the shaft 38 upwardly inclinedly around a roller or shaft 39 and down against the scraper 40, which scrapes the bugs off the belt and then down around the rollers 41, 42 and 43 and upward around a roller 44, whence it passes to the shaft 19 first mentioned in the course of the belt. By this last described means the bugs as fast as they are brushed from the vines inward on to the belt above the pan, are carried up and deposited in the hopper 31, from whence they are crushed between the rollers 33 and let fall upon the inclined bottom strip 34 as before described.

The shaft 19 will be operated from the sprocket-wheel 17 on the hub of the ground-wheel 10 through the medium of the sprocket-chain 20 and the sprocket-wheel 18 on the said shaft 19, the said sprocket-chain 20 passing about the said sprocket-wheels. The sprocket wheel 51 on the said driven shaft 19, engaging the sprocket chains 35 on the margins or edges of the apron A.

The ends of the rollers 39—44 will be suitably mounted in the frame of the machine, some of which has been omitted in the drawings for the sake of perspicuity of illustration of the salient features of the invention, it being understood that the frame-work and some other parts may be varied in form and arrangement within the scope of mechanical skill without departing from the nature or spirit of the invention.

The rollers 33 may be operated as often as may be desirable to keep the hopper from overflowing with bugs and to kill them faster than they can crawl out from the hopper.

What is claimed is—

1. An implement for gathering potato bugs, comprising ground wheels, their axle, and a frame supported therefrom, a pan carried between the wheels, an endless movable apron supported by the frame, means for operating it from the ground wheels, a hopper also supported by the frame, rollers for guiding the apron above the pan and to and in proximity with the hopper to deposit bugs on the belt into said hopper.

2. An implement for gathering potato bugs, comprising ground wheels, their axle and a frame supported therefrom, a pan carried between the wheels, an endless movable apron, supported by the frame, means for operating it from the ground wheels, a hopper also supported by the frame, rollers for guiding the apron above the pan and to and in proximity with the hopper to deposit bugs on the belt into said hopper, and means connected with the hopper to crush or kill the bugs and deposit the same after being killed on the ground.

In testimony whereof, I affix my signature, in presence of two witnesses.

ABRAHAM J. BUHLER.

Witnesses:
ADOLPH HOUKANSON,
JOHN F. SOMMER.